United States Patent Office 3,023,255
Patented Feb. 27, 1962

3,023,255
PROCESS OF DESULFURIZING CRYSTALLIZABLE AROMATIC HYDROCARBONS
Karl Friedrich Lang, Frankfurt, Walter Metzendorf, Kronberg (Taunus), Johannes Turowski, Castrop-Rauxel, and Heinrich Gick, Duisburg-Wanheimerort, Germany, assignors to Rutgerswerke-Aktiengesellschaft, Frankfurt am Main, Germany
No Drawing. Filed Sept. 25, 1959, Ser. No. 842,191
Claims priority, application Germany Sept. 27, 1958
4 Claims. (Cl. 260—674)

This invention relates to the desulfurization of hydrocarbons and it has particular relation to the removal of sulfur compounds from crystallizable aromatic hydrocarbons.

It has been suggested previously to treat crude naphthalene with catalytically acting agents, such as aluminum chloride, iron chloride or boron fluoride (see French Patent No. 912,344 and British Patent No. 571,398) in order to cause polymerization of olefins or diolefins present in the crude naphthalene. Tests carried out by applicants have shown that action of $BF_3$ on naphthalene or on its solution in benzene, does not result in desulfurization at temperatures in the range of 100°–150° C. It was necessary to use temperatures as high as about 400° C. and $BF_3$ in gaseous condition in order to attain reduction of the sulfur content to about 0.13%. However, treatment with gaseous $BF_3$ causes difficulties connected with the apparatus, particularly in connection with the dosage to be applied.

It has been further suggested to use for the desulfurization of mineral oil products instead of $BF_3$, its addition compounds with water or with organic compounds, e.g. alcohols and ethers (see U.S. Patent No. 2,657,175 and French Patent No. 1,048,630). However—in spite of the use of high temperatures, as well as increased or high pressures, and proceeding in the presence of hydrogen—complete desulfurization could not be attained in these processes. The addition of basic organic compounds to the $BF_3$-complex compound (see U.S. Patent No. 2,745,792, Chem. Abstracts 50(1956)17421) did not result in extensive desulfurization at ordinary atmospheric pressure and at ordinary room temperature.

If naphthalene which contains as impurities sulfur compounds, is brought in direct contact with complex compounds of $BF_3$ at 100°–160° C., in processing the product thus treated a naphthalene still containing 0.17 to 0.38% sulfur is obtained.

It has now been found that naphthalene and other crystallizable aromatic hydrocarbons can be satisfactorily desulfurized by a simple process by means of $BF_3$-complex compounds, sometimes also called coordination compounds, if treatment of the material to be desulfurized with the $BF_3$-complex compound is carried out in the presence of solvents which dissolve either all of the two reactants, or at least a considerable part of them. The solvents used in carrying out this invention, must be inert to the $BF_3$-complex compounds used. As examples of the $BF_3$ compounds which can be used in this process, coordination compounds of $BF_3$ with formic acid, acetic acid, methanol and other alcohols, ethers and phenols are mentioned.

The following examples describe some specific embodiments of and best modes for carrying out the invention, to which the invention is not limited.

Example 1

To a solution of 98.5 grams of naphthalene having a solidification point of 78.0° C. and containing 0.6% of sulfur, in 100 grams of nitrobenzene, an amount of 1.5 grams of $BF_3.2CH_3COOH$ is added at about 100° C. Thereby the mixture is dyed a full red at once. The resulting product is stirred at 100° C. for ½ hour, is then permitted to cool and the crystalline naphthalene is sharply drawn off by suction on a suction filter. After being washed with water and dried, the naphthalene contains 0.15% of S. 49.5 grams of this product are dissolved in 50 grams of nitrobenzene and the solution is treated again with 0.5 gram of $BF_3·2CH_3COOH$ in the before described manner. The naphthalene obtained in the second treatment contains 0.07% of S. only.

The nitrobenzene mother liquors, in which about 20% of naphthalene remains dissolved can be used again in further batches from which desulfurized naphthalene can be obtained by crystallization in practically quantitative yields.

Example 2

In the process of the above Example 1, the $BF_3,2CH_3COOH$ is substituted by an equivalent amount (i.e. an amount which contains an equal amount of $BF_3$) of one of the following coordination compounds:

$C_2H_5OH.BF_3$      $CH_3OC_6H_5.BF_3$
$2C_2H_5OH.BF_3$     $(CH_3CO)_2O.BF_3$
$CH_3COOH.BF_3$      $(CH_3CO)_2(CHCO)_2O.3BF_3$
$C_6H_5COOH.BF_3$    $HCOOC_2H_5.BF_3$
$2C_6H_5COOH.BF_3$   $CH_3COOC_6H_5.BF_3$
$(COOH)_2.BF_3$      $(CH_3)_2CO.BF_3$
$(C_2H_5)_2O.BF_3$   $CH_3CHO.BF_3$
$CH_3OC_2H_5.BF_3$   $C_6H_5OH.BF_3$

The other conditions of the process are the same as in the above Example 1.

Example 3

To a solution of 98.5 grams of naphthalene having a solidification point of 78.8° C. and containing 0.6% of sulfur, in 100 grams of acetophenone, 1.5 grams of $BF_3.2CH_3COOH$ is added at about 100° C. The resulting product is stirred at about 100° C. for about 30 minutes, is then permitted to cool and the crystalline naphthalene is separated on a suction filter. The crystalline product is washed with water and dried and 49.5 grams of the dried product are dissolved in 50 grams of acetophenone and treated again with 0.5 gram of $$BF_3.2CH_3COOH$$

The naphthalene thus obtained contains 0.05% S.

Example 4

98.5 grams of acenaphthene with a sulfur content of 0.1%, are dissolved in 100 grams of acetophenone at about 100° C. To the solution 1.5 grams of $$BF_3.2CH_3OH$$

are added and the solution is then stirred at 100° C. for about 30 minutes. Acenaphthene crystals thus obtained are free from sulfur.

Example 5

98.5 grams of acenaphthene with a sulfur content of 0.1%, are dissolved in 100 grams of nitrobenzene at about 100° C. To the solution 1.5 grams of $BF_3.2CH_3COOH$ are added and the solution is then stirred for about 30 minutes at 100° C. The acenaphthene crystals thus obtained after cooling and crystallizing are practically free from sulfur.

It will be understood from the above that this invention is not limited to the specific hydrocarbons, complex compounds of $BF_3$, solvents, proportions, temperatures and other conditions specifically described above and can be carried out with various modifications without departing from the scope of the invention as defined in the appended claims.

Thus, the $BF_3$ addition compound can be used in an amount of 0.1 to 2.0% based on the weight of the hydrocarbon to be desulfurized. The temperature of treatment is in the range of 50 to 150° C. The solvent is used in an amount in which either the total amount of the hydrocarbon to be desulfurized, as well as the total amount of the $BF_3$ addition compound, or a considerable part of them are dissolved. In the above examples 49.25% of the hydrocarbon to be desulfurized and 0.75% of the $BF_3$ addition compound are dissolved.

The parts indicated therein are by weight if not otherwise stated.

What is claimed is:

1. A process for desulfurizing crystallizable aromatic hydrocarbons, comprising treating the hydrocarbon to be desulfurized at elevated temperature in the range of 50° to 150° C. with a complex compound of $BF_3$ in the presence of a solvent selected from the group consisting of nitrobenzene and acetophenone, in which at least part of the hydrocarbon and said complex compound are dissolved.

2. A process as claimed in claim 1, in which the complex compound is $BF_3 \cdot 2CH_3COOH$.

3. A process as claimed in claim 1, in which the solvent is nitrobenzene.

4. A process as claimed in claim 1, in which the solvent is acetophenone.

References Cited in the file of this patent

UNITED STATES PATENTS

| | | |
|---|---|---|
| 2,415,171 | Horeczy | Feb. 4, 1947 |
| 2,495,851 | Lien et al. | Jan. 31, 1950 |
| 2,495,852 | Lien et al. | Jan. 31, 1950 |
| 2,745,792 | Shiah | May 15, 1956 |